Sept. 18, 1962 W. A. PENNOW 3,054,913
SYNCHRONIZED PULSING SYSTEM
Filed Jan. 20, 1958 3 Sheets-Sheet 1

WITNESSES:
Bernard R. Gieguen
James F. Young

INVENTOR
Willis A. Pennow
BY Arthur T. Stratton
ATTORNEY

Sept. 18, 1962 W. A. PENNOW 3,054,913
SYNCHRONIZED PULSING SYSTEM

Filed Jan. 20, 1958 3 Sheets-Sheet 2

Sept. 18, 1962 W. A. PENNOW 3,054,913
SYNCHRONIZED PULSING SYSTEM
Filed Jan. 20, 1958 3 Sheets-Sheet 3

United States Patent Office 3,054,913
Patented Sept. 18, 1962

3,054,913
SYNCHRONIZED PULSING SYSTEM
Willis A. Pennow, Cleveland, Ohio, assignor to Westinghouse Electric Corporation, East Pittsburgh, Pa., a corporation of Pennsylvania
Filed Jan. 20, 1958, Ser. No. 709,901
19 Claims. (Cl. 307—132)

The invention relates generally to synchronizing systems for sequence pulsing systems and the like, and more particularly to a synchronizing system for a pulsing system for operating automatic machines or flashing beacon lights for airports.

In manufacturing operations employing automatic machines and in the timed sequence operation of flashing beacons for airports and other similar systems, in order to get the precise intervals between the operations of the machines and the flashing of the beacons, it has been the practice to transmit timed impulses to each machine or beacon from a control station. This method requires the provision of a circuit system to each machine, beacon or other device that it is desired to operate in a timed sequence. A provision of a control station with circuit systems leading to each machine or each beacon results in a complicated circuit system and elaborate control mechanisms which are expensive to install and difficult to keep in operation.

One object of the invention is to provide a system for synchronizing the operation of a plurality of impulse delivering units located at different machines or beacons to effect their operation in a predetermined timed sequence. It will be apparent, as this description proceeds, that the pulsing system of the invention can be operated with equal facility to deliver sequential groups of simultaneous pulses to the beacons or other load devices.

It is also an object of the invention to provide a synchronizing system for a sequence pulsing system for operating a plurality of dispersed units in a predetermined timed sequence and for periodically checking the timed operation of the units and synchronizing each unit with the timed operation of the other units.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which.

Figure 5:
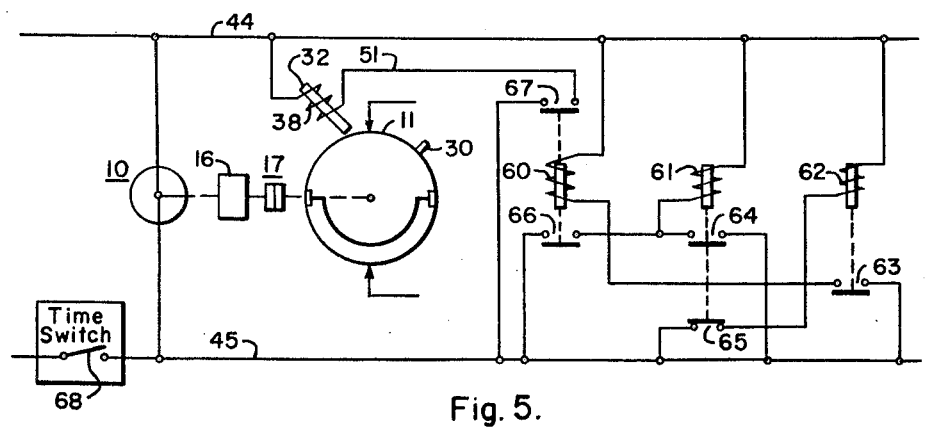
Figure 4:
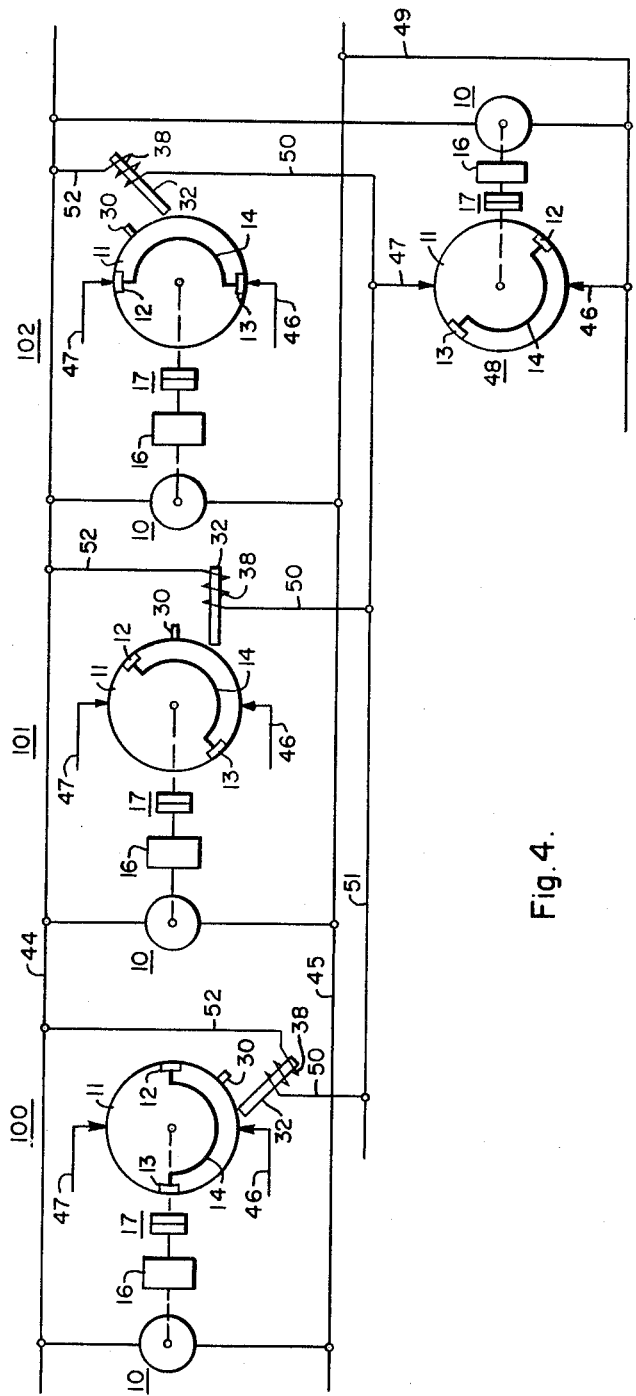

FIG. 4 is a circuit diagram of a system for synchronizing a plurality of units provided for sending out electrical current impulses to effect the delivery of the electrical current impulses in a predetermined timed sequence; and FIG. 5 is a circuit diagram of a system for synchronizing a plurality of units provided for sending out electrical current impulses utilizing relays for delivering the current impulses to effect the release of the checking and synchronizing means.

Figure 1:
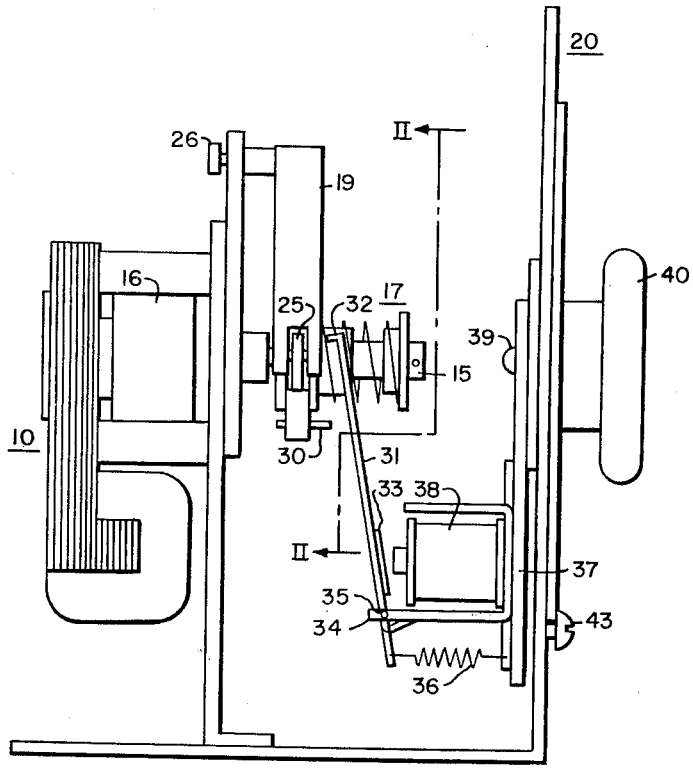
FIGURE 1 is a view in side elevation of a unit for controlling the delivery of electrical impulses in a transmission system.

Referring now to the drawings and FIG. 1 in particular, a motor shown generally at 10 is provided for driving the members of a unit that will be described hereinafter. Any constant speed motor may be employed for driving the unit, however, since a large number of units are usually employed in any system, it is preferable to employ synchronous motors since they will all operate at substantially the same speed. The motors may be supplied from any power system available; usually a 110-volt power source is adequate. The motor is utilized for driving a movable member such as a cam wheel or rotatable disc 11. Obviously, the movable member can be driven along a prescribed path, circular or non-circular depending upon the application of the invention, rather than being pivoted for rotation.

The function of the cam wheel as will appear hereinafter is to send out electrical current impulses at predetermined intervals. It is made in the form of a disc from some suitable insulating material such as a resin impregnated fabric. Two contact members 12 and 13 are countersunk in the outer periphery of the disc as shown. These contact members are electrically connected to one another by means of a conductor 14 attached to one side of the disc 11. The disc 11 is loosely mounted on a shaft 15 disposed in alignment with the shaft of the motor 10.

The shaft 15 is driven by the motor 10 through a train of gears disposed in a gear case 16. The gear train will not be described in detail since such mechanisms are well known in the art. The gear train may be designed to drive the shaft 15 at any predetermined speed.

In order to effect the driving of the cam wheel 11 from the driven shaft 15, suitable slip means such as a clutch shown generally at 17 is employed to make the connection. The slip clutch 17 is keyed to the shaft 15. Therefore, it is driven from the motor through the train of gears continuously. The slip clutch engages the cam wheel or rotatable member 11 and drives it continuously unless the latter is held in a manner to be described hereinafter. Since slip clutches are well known in the art, the member 17 will not be described in detail. It is sufficient to say that the slip clutch 17 turns continuously when the motor is in operation, and if the rotatable member or cam wheel 11 is not held, it rotates by frictional engagement with the clutch.

Figure 2:
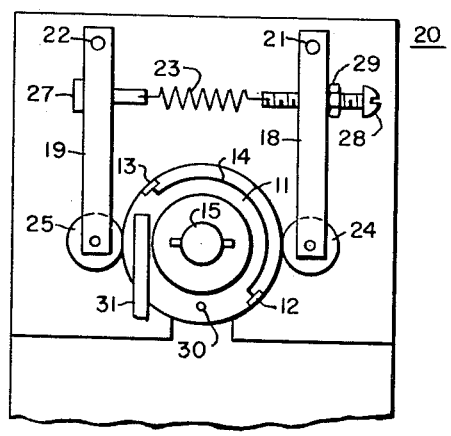
FIG. 2 is a view in section taken along the line II—II of FIG 1.

In order to utilize the cam wheel 11 for effecting the delivery of electrical current impulses periodically, a pair of arms 18 and 19 are suspended from the frame 20 of the unit as best shown in FIG. 2. The frame 20 is of an electrical insulating material, for example, a molded insulating material. These arms are pivotally mounted at 21 and 22 and are biased toward one another by means of a spring 23. Rotatably mounted in the lower ends of the arms 18 and 19 are contact wheels 24 and 25, respectively. These contact wheels are disposed in alignment with and ride on the periphery of the cam wheel 11. Therefore, as the movable member or cam wheel rotates or is otherwise driven along its prescribed path, the contact wheels 24 and 25 will ride over the contact members 12 and 13, in this example making electrical contact therewith twice during every revolution or traverse of the path.

The contact wheels 24 and 25 and the arms 18 and 19 will be made of some well-known electrically conducting material to form part of a circuit to be described hereinafter. The pins 21 and 22 on which the arms 18 and 19 oscillate are also metallic and have binding posts 26 mounted on their ends next to the motor 10 as shown in FIG. 1. These binding posts are for receiving electrical conductors that will be referred to hereinafter.

Referring now to FIG. 2, it will be observed that the biasing spring 23 is connected to depending arm 19 by means of a rivet-shaped member 27. This member will be made from some suitable insulating material with the result that the arms 18 and 19 are not electrically connected by the biasing spring 23. The member 28 connecting the other end of the biasing spring 23 to the arm 18 is a metallic threaded screw provided with a nut 29 for setting it in different predetermined positions relative to the arm 18 to provide for tensioning the spring 23.

When a plurality of units are employed controlling the operation of a number of machines or beacon lights, it is desirable to provide for checking and synchronizing the units periodically. In this embodiment of the invention as best shown in FIG. 1, the mechanism for performing the checking and synchronizing operation comprises a pin 30 which is mounted in the cam wheel 11 near its periphery. Therefore, as the cam wheel 11 rotates, the pin describes a circular path or otherwise assumes the prescribed path of the movable member.

Disposed adjacent the pin 30 is a latch 31 with a laterally turned portion 32 which extends into the path of the pin 30. Therefore, as the cam wheel 11 revolves, the pin 30 will engage the member 32 of the latch 31. The purpose of the latch 31 with the laterally extending end member 32 and associated mechanism as will be explained hereinafter is to stop the cam wheel once every revolution.

The latch 31 is so disposed that the laterally extending end member 32 normally stands in the path of the pin 30. In order to so mount the latch 31 that it can be utilized to stop the cam wheel 11 at predetermined intervals, it is provided with an armature 33. In this embodiment of the invention, the latch 31 and the armature 33 are soldered or welded to one another, thus forming a rigid structure which is pivotally mounted on the bracket 34 at the point 35. A spring 36 is connected between the armature 33 and a rotatably mounted arm 37 to bias the latch 31 to a position where the laterally extending member 32 will lie in the path of the pin 30.

In order to release the pin 30 to permit the cam wheel 11 to rotate, an electromagnet 38 also mounted on the arm 37 is provided for actuating the armature 33 to swing the latch 31 about its pivot point 35 carrying the laterally extending end member 32 out of the path of the pin 30. The circuits for operating the electromagnet and for the timing of its operation will be described hereinafter.

In order to stop the cam wheel 11 of one unit in a predetermined timed sequence in relation to another unit, provision is made for moving the latch 31 along and generally parallel to the path of the pin 30 so that the laterally extending member 32 of the latch can be set in different positions in and along the path of the pin 30. In this embodiment of the invention in order to so move the latch 31, a pin or shaft 39 is rotatably mounted in the frame 20 in axial alignment with the shaft 15 on which the cam wheel 11 is mounted. A hand wheel 40 is provided for rotating the shaft 39.

The arm 37, on which the bracket carrying the latch 31 and the electromagnet 38 are mounted, is keyed to the shaft 39. In mounting the latch 31 and the bracket 34 on the arm 37, they are so disposed that the laterally extending end member 32 extends into the path of the pin 30. Therefore, as the arm 37 is rotated through operation of the hand wheel 40, the laterally extending member 32 will travel along the same path as described by the pin 30. Therefore, by rotating the arm 37 and the latch 31, the laterally extending member 32 can be set to stop the cam wheel in different angular positions, in this example. In such manner provision may be made for stopping the cam wheels 11 of the different units in the same or different angular positions relative to one another. The purpose of stopping the cam wheels in different angular positions will be described hereinafter. The shaft 39 together with the parts mounted thereon are not freely rotatable, but considerable friction is interposed so that the arm 37 and latch 31 will remain at any angular position to which they are adjusted, even when the latch member 32 is engaged by the pin 30.

Obviously, movable members mounted for movement other than rotational can be similarly stopped in the same or different positions along respective, prescribed paths of other than the circular configuration, by suitably mounting associated latch mechanisms for movement to selected positions along these paths.

Figure 3:
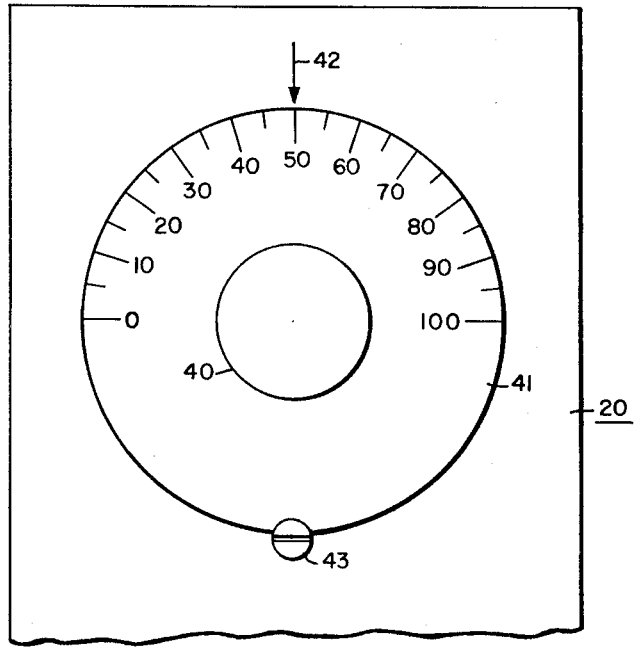
FIG. 3 is a top plan view of a dial for setting the unit for timed sequential operation.

Referring now to FIG. 3, a dial 41 is provided in conjunction with the hand wheel 40 to facilitate the setting of the latch 31 of the unit to stop the cam wheel 11 in different angular positions. The dial 41 illustrated is only by way of example. However, a dial will suffice for setting a large number of units. With a dial such as 41, by starting with zero opposite the arrow 42 and setting each radial mark from zero to 100 opposite the arrow, 21 units could be set to stop in different angular positions relative to one another. A dial of this type can be calibrated to facilitate the setting of a large number of units to stop in different predetermined positions relative to one another. If very fine adjustments are desired, a vernier device which is well known in the art may be employed.

It sometimes happens that these units are employed where the framework is subject to vibration or external operations which may result in some rotation of the dial 41 and the shaft 39. In this embodiment of the invention, means is disclosed for locking the dial in any predetermined position. As shown, a screw 43 is mounted in the frame 20 and may be actuated to engage the dial and hold it in position under all operating conditions.

In order to utilize a plurality of units similar to the unit described hereinbefore to deliver electrical current impulses in a predetermined timed sequence to control the operations of a plurality of machines or beacon lights for airport approach lighting systems and similar devices, a plurality of units, for example, those shown generally at 100, 101 and 102 (FIG. 4) are connected in a single circuit which extends from station to station where the units are located. The circuit comprises conductors 44 and 45 which may be supplied from any suitable power source (not shown). Further, a manually operated switch or other device (not shown) for closing and interrupting the circuit may be employed.

In order to utilize the units for delivering impulses, conductors 46 and 47 will be provided for each unit and connected through the binding posts 26 to the arms 18 and 19 of each unit. These conductors 46 and 47 will extend from each unit to the machine or beacon light, and during each cycle, the units will cooperate in sending current impulses to their respective machines or beacons. Further, a source of power (not shown) will be connected in one of the conductors 46 or 47 provided with each unit.

In order to actuate the latches 31 of the different units periodically, a transmitter shown generally at 48 is provided. This transmitter is the same as the units 100, 101, 102 described hereinbefore with the exception that the latch 31 and its associated operating devices are removed. The motor 10 of the transmitter 48 will be connected across the line conductors 44 and 45 and operated continuously.

The conductors 46 and 47 of the transmitter 48 connected to the arms 18 and 19 through the binding posts 26 will be connected across the power lines 44 and 45. The conductor 46 will be connected through the conductor 49 to the power line 45 while conductor 47 is connected through conductors 50 and electromagnets 38 to the power line 44. Therefore for every revolution of the cam wheel 11 of the transmitter 48, each electromagnet will receive two current impulses and be released twice.

The circuit system described hereinbefore comprises a plurality of units 100, 101, 102 connected to deliver current impulses to machines or beacon lights (not shown)

to effect predetermined operations. In addition, a transmitter is disclosed connected to cooperate with the units to check and synchronize the operation of the units to effect the delivery of current impulses in a predetermined timed sequence. While only three units are shown connected in the system, it will be appreciated that any number may be employed to meet requirements.

Preparatory to the operation of a circuit system such as described hereinbefore, the dials 41 of the different units 100, 101, 102 will be set. By the operation of the dials 41 of the different units, the latches 32 may be disposed in different angular positions around the cam wheels 11. In this illustration, if we consider rotation in the direction of the hands of a clock, the latch 32 of unit 100 is disposed 45° in advance of latch 32 of unit 101. Similarly, latch 32 of unit 101 is disposed angularly 45° in advance of latch 32 of unit 102. Therefore, when the synchronous motors 10 are in operation, the cam wheels 11 of the units 100, 101, 102 will be stopped in these corresponding different angular positions. Since the pins 30 on the cam wheels 11 are all disposed in the same relative positions to the contact members 12 and 13 carried by the cam wheels, the different units will deliver impulses in a predetermined timed sequence depending on the speed of rotation of the cams and the angular relative positions of the contact members 12 and 13 effected through the latches 32. Therefore, by setting the dials 41, the delivery of current impulses in predetermined timed sequence may be effected.

The latches 32 are also utilized for checking and synchronizing the different units. As described hereinbefore, the latches 32 are carried by arms 37 keyed to shaft 39 to which the dials 41 are also keyed. Therefore, when the dials 41 are locked in different predetermined positions, the latches 32 are positively set in predetermined selected positions. Further, the latches 32 are normally disposed in the paths of the pins 30 carried by the cam wheels 11. Consequently once during every revolution each cam wheel 11 will be stopped. The units 100, 101, 102 are all driven from the synchronous motors 10 through a train of gears 16 which are designed to drive the cam wheels 11 at a predetermined speed. In order to provide for proper checking and synchronizing of the units 100, 101, 102, the transmitter 48 is preferably driven at a slightly slower speed. This can readily be effected by changing the design of the gear train 16 of the transmitter 48. The speed relationship of the units 100, 101 and 102 to the transmitter 48 will depend on the precision with which the synchronizing of the units 100, 101, 102 is to be effected.

We will assume for purposes of illustration that the cam wheels 11 of the units 100, 101, 102 are driven at a speed of 61 r.p.m. while the cam wheel 11 of transmitter 48 is driven at a speed of 60 r.p.m. and that this gives satisfactory synchronizing of the delivery of the impulses in the predetermined timed sequence. It will be readily understood that any required synchronization may be effected with this checking and synchronizing system by design.

Assuming now that the dials have been set to effect the delivery of current impulses in a predetermined timed sequence and that the control switch (not shown) has been closed, all the motors are running and the cam wheels 11 are rotating. Once during every rotation of each cam wheel it will be stopped by its corresponding latch 32. The stopping of the cam wheels 11 will not in any way damage the unit because of the slip clutches 17 provided in each unit. If the cam wheels 11 are not disposed in proper angular relationship to one another, this will be checked by the latches 32 and they will be set in the angular relationship indicated by the dials 41 on the first revolution of each unit. Since the cam wheel 11 of the transmitter 48 rotates more slowly than the cam wheels 11 of the units 100, 101, 102, this provides for the stopping of the cam wheels 11 of the units 100, 101, 102 once during every revolution. Therefore, any deviation of one cam wheel from proper angular relationship to the other cam wheels is checked and synchronization effected once during every revolution.

Twice during every revolution of the cam wheel 11 of the transmitter 48, a circuit is established which energizes the solenoids 38 to actuate the latch 32 to release the pin 30 and permit the cam wheels 11 to continue their rotation to deliver the current impulses in proper timed sequence. The circuit established for releasing the latches 32 by means of the solenoids 38 may be traced from the line 45 through conductor 49, conductor 46, contact member 12 on the cam wheel 11, conductor 14, contact member 13, also on the cam wheel 11, conductors 47 and 51 and conductors 50 through solenoids 38, conductors 52 to line 44. In tracing this circuit it is assumed that the cam wheel 11 of the transmitter 48 is rotating clockwise and that the contact members 12 and 13 will engage the contact wheels 24 and 25 carried by the arms 18 and 19 described hereinbefore. In such manner, the conductor 46 will be electrically connected to the conductor 47.

In a circuit system such as described hereinbefore, if there is a failure of power and due to inherent characteristics the machine or beacons are thrown out of synchronism, then on the restoration of power the units will all be checked and synchronized instantly to effect the delivery of current impulses in the predetermined time sequence for which the system was originally set. The checking and synchronizing of the machine is effected through positive mechanical devices which will not fail. Therefore, the system is reliable and easily maintained. Further, there is only one circuit system extending to all stations, and it can readily be understood and operated by maintenance men.

For some purposes it may be desirable to employ a different type of current impulse transmitter for controlling the checking and synchronizing of the units 100, 101, 102. Refer now to FIG. 5 which shows a relay controlled current impulse transmitter. When this type of transmitter is utilized, it will be substituted for the transmitter 48 shown in FIG. 4. The connections will be made as shown in FIG. 5.

In the circuit system illustrated in FIG. 5, only one unit for delivering impulses to a machine or beacon is illustrated. However, it will be appreciated that any number of units may be connected in the circuit system in the manner illustrated in FIG. 4. Any number of units, such as 100, 101, 102, may be connected in the system illustrated in FIG. 5, but only one pulsing transmitter will be employed per system.

The current impulse transmitter of FIG. 5 compises relays 60, 61 and 62 all connected between the line conductors 44 and 45. The relay 62 is a thermal type relay which may be designed to operate under predetermined conditions. It can be designed to respond to a predetermined heating current in a selected length of time. The contact members 63 of the thermal relay 62 are connected in series circuit relationship with the actuating coil of relay 60. The contact members 63 of the thermal relay stand open when the relay 62 is at room temperature or at least not heated to its operating temperature.

The relay 61 has two sets of contact members 64 and 65. The contact members 64 are connected in series circuit relationship with the actuating coil of relay 61 and in parallel with contact members 66 of the actuating coil of relay 60. The contact members 65, of relay 61 are connected in series circuit relationship with the actuating coil of thermal relay 62 and normally stand closed. As described, the contact members 66 of the relay 60 are connected in parallel circuit relationship with the contact members 64 of the relay 61. The other set of contact members 67 of the relay 60 are connected in the conductor 51 leading to the solenoids 38 for actuating the latches 31 to release the cam wheels 11 of the units.

A time switch 68 of any well known type which closes and opens periodically and which may be set to accommodate the operating cycle of the relays to be described hereinafter is provided for controlling the supply line 45. When switch 68 is closed, current will flow in the actuating coil of the relay 62. The circuit extends from line 45 through the normally closed contact members 65 of the relay 61, the actuating coil of relay 62 to the line 44. The current flow heats the actutaing coil of the relay 62, causing it to close the contact members 63 connected in series circuit relationship with the actuating coil of the relay 60.

When the relay 60 is energized, it closes contact members 66 and 67. When contact members 66 are closed, a circuit is established extending from line conductor 45 through contact member 66 and the actuating coil of relay 61 to line 44. The energization of relay 61 closes the contact member 64, establishing, a holding circuit for the relay 61. The holding circuit extends from line conductor 45 through the contact member 64 of relay 61 and the actuating coil of the relay 61 to line conductor 44. Therefore, relay 61 remains energized. When relay 61 is actuated, closing the contact members 64, the contact members 65 connected in series circuit relationship with the actuating coil of the relay 62 are opened.

As pointed out hereinbefore when relay 60 is energized, the contact members 67 are closed. When the contact members 67 are closed, current flows from the line conductor 45 through contact members 67, conductor 51, to the solenoids 38 of each unit back to the line conductor 44. Thus, the latches 31 of all the units are tripped and the cam wheels 11 are driven by the motors 10 through the slip clutches 17.

When the contact members 65 of the relay 62 are opened, the thermal relay 62 cools down and drops out the contact members 63 connected in series circuit relationship with the actuating coil of relay 60.

After all the latches 31 have been tripped as described, the time switch 68 will open interrupting the holding circuit through conductor 45 for the relay 61. The contact members 64 open and the system is ready for the next cycle.

When the time switch 68 closes again, the heating circuit for the relay 62 described hereinbefore is reestablished, and as soon as the relay 60 is closed in the manner disclosed, another current impulse will be delivered to the units connected between the line conductors 44 and 45. This current impulse transmitter depends for its timing on the heating characteristics of the thermal relay 62.

The thermal relay 62 will be so designed that the time interval between the current impulses delivered is longer than the time required for a rotation of the cam wheels 11. Therefore, all the cam wheels 11 will be stopped once per revolution to enable the checking and setting of them to operate in synchronism with great precision. When all the cam wheels have been stopped and properly synchronized with one another, a current impulse will be delivered by the transmitter releasing all the latches and permitting the rotation of the cam wheels 11 to deliver impulses to the machines or beacons or any other device to be operated in a predetermined timed sequence.

Other types of current impulse transmitters may be provided in conjunction with the units described hereinbefore and the checking and synchronizing of the units will be effected in the same manner.

The frequency of the checking and synchronizing of the units may be varied to suit the conditions of operation. Where the operating conditions require less frequent checking and synchronizing of the units, this may be taken care of by varying the speed of a transmitter 48 and the cam wheels 11 in the modification illustrated in FIG. 4. It can be taken care of in the modification shown in FIG. 5 by controlling the intervals between the sending out of impulses which depend on the time characteristics of the thermal relay.

Synchronizing systems for sequence pulsing systems for some purposes do not have to be operated with the precision that is required in the other cases. In the modification described, the units are checked and synchronized once for every revolution of the cam wheels. There are many operations which would employ an impulse delivering system of the type described in which it would be adequate to check and synchronize the units once for every 10 or even 100 revolutions of the cam wheel.

In such systems in building the units, the latch 31 would be mounted differently. It would be pivoted above the solenoids 38 and biased by a spring 36 to a position where the laterally extending member 32 would not stand in the path of the pin 30. When it is desired to check and synchronize the units, the transmitter would be employed to energize the solenoids 38 and project the laterally extending member 32 into the path of the pin 30 to stop the cam wheel 11. The conductor 44 would be energized long enough to keep the arms 31 energized for a sufficient period of time to stop all the cam wheels 11 of all the units such, for example, as 100, 101, 102 shown in FIG. 4 to set them in the relative positions to which they had been set to deliver current impulses in a predetermined timed sequence and then release them all simultaneously. Since such a modification involves reversal in operation of certain members and can readily be made by anyone skilled in the art, a further detailed description will not be given.

Certain changes may be made in the above construction and different embodiments of the invention could be made without departing from the scope thereof; for example, the pins 30 can be mounted at the same rather than differing angular positions relative to the associated cam wheels 11, if desired. In the latter case, the pulsing system would deliver sequential groups of synchronized simultaneous pulses to the respective beacons or other load devices to ensure their simultaneous operation. Accordingly, it is intended that all matter contained in the above description or shown in the accompanying drawings shall be interpreted as illustrative and not in a limiting sense.

I claim as my invention:

1. In a synchronizing system for a sequence pulsing system, in combination, a plurality of units capable of cooperative operation electrically connected to one another in a circuit system to effect the periodic flow of electrical current impulses, means for setting the units to effect a current flow in one unit in response to the operation of said unit in any predetermined timed relationship to the current impulse delivered through the operation of another unit in the system, and means cooperative to effect the continued operation of all the units in the said predetermined timed relationship.

2. In a synchronizing system for a sequence pulsing system, in combination, a plurality of units for delivering current impulses periodically connected in circuit relationship, means for setting each unit to effect the delivery of the current impulses from all units in a predetermined timed sequence, means for interrupting the functioning of the impulse sending units temporarily, and means for actuating the means for interrupting the operation of the impulse sending means of all units simultaneously when they have been sychronized to maintain the units delivering current impulses in a predetermined timed sequence.

3. In a unit for delivering current impulses, in combination, a rotatable member for making and breaking an electrical circuit periodically to send electrical current impulses, a means for driving said rotatable member, a slip clutch disposed between the rotatable member and said driving means, means for engaging and stopping the rotatable member, and means for setting the means for engaging and stopping the rotatable member in different angular positions relative to the rotatable member.

4. In a unit for a synchronizing system for a sequence pulsing system, in combination, a rotatable member, means cooperative with the rotatable member for effecting the delivery of current impulses, means for driving the rotatable member, a slip clutch disposed between the rotatable member and the driving means, latching means disposed for operation for stopping the rotatable member, means for setting the latching means in different angular positions relative to the rotatable member, and a solenoid for actuating the latching means to release the rotatable member.

5. In a synchronizing system, for a sequence pulsing system, in combination, a plurality of units operable for delivering current impulses, an electrical circuit system in which the units are connected in cooperative relationship for delivering current impulses, means associated with each unit for timing the delivery of current impulses to provide for the setting of a plurality of units to deliver current impulses in a predetermined timed sequence, means cooperative for interrupting the functioning of each unit to set all the units in the relationship to one another required for delivering the current impulses in the predetermined timed sequence, and means for releasing all units simultaneously to effect their continued operation to deliver current impulses in the predetermined timed sequence.

6. In a synchronizing system for a sequence pulsing system, in combination, a plurality of motor driven units for making and breaking circuit systems periodically to deliver current impulses, means associated with each unit for controlling the delivery of the current impulses of one unit relative to the delivery of the current impulses from another unit to provide for delivering current impulses in a predetermined timed sequence, means cooperative with each unit for interrupting the delivery of current impulses and for effecting the setting of all the units in the correct relationship to deliver impulses in a predetermined timed sequence thereby synchronizing the motor driven units and a circuit system controlled by a timed relay system for periodically releasing the means for interrupting the sending of current impulses whereby they will continue to deliver current impulses in the predetermined timed sequence.

7. In a unit for controlling the delivery of current impulses in combination, a rotatable member for controlling the delivery of the current impulses, means for driving the rotatable member, a slip clutch disposed for connecting the driving means to the rotatable member, means for engaging the rotatable member to stop it, said means being disposed to be set in any predetermined angular position relative to the rotatable member and means for releasing the means provided for stopping the rotatable member, whereby the rotatable member will again be driven by the driving means.

8. In a synchronizing system for a sequence pulsing system provided for controlling units at different locations, in combination, a plurality of motor driven units cooperative to deliver current impulses at the different locations, a single circuit system connecting all the units at the different locations to deliver power for operating the motors, each unit comprising a cam wheel provided with means for closing and interrupting circuit connections cooperative in delivering current impulses, a slip clutch disposed between the cam wheel and the motor of each unit, adjustable means disposed in each unit to be set in different predetermined positions for interrupting the rotation of the cam wheel and means in each unit cooperative for releasing the means for interrupting the rotation of the cam wheel to permit the operation of all the units to cooperate in delivering current impulses in a timed sequence.

9. In a synchronizing system for a sequence pulsing system for controlling the delivery of current impulses at a plurality of locations, in combination, a plurality of motor driven units one at each location cooperative in delivering the current impulses one at each location, a single circuit system including a power source extending to all the motor driven units to supply power to the motors, each unit comprising a cam wheel driven by the unit motor, a slip clutch disposed between the cam wheel and motor, means carried by the cam wheel for closing and interrupting circuit connections, a local circuit at each location for delivering current impulses controlled by the means provided in the cam wheel for closing and interrupting circuit connections, means associated with each unit for interrupting the rotation of the cam wheel once during every revolution, a transmitter for periodically releasing the means provided for interrupting rotation of the cam wheel, the transmitter serving to release all the cam wheels simultaneously to provide for their operation in a predetermined relationship between one another to deliver current impulses in a predetermined timed sequence.

10. In a synchronizing system for a sequence pulsing system for delivering current impulses to a plurality of locations, in combination, a local power circuit for supplying current at each location, a plurality of units cooperative in delivering current impulses associated with the local power circuit at each location, each unit comprising a motor driven cam wheel, means carried by each cam wheel for closing and interrupting the local power circuit to effect the delivery of a current impulse, a slip clutch disposed between the cam wheel and motor, a pin carried by each cam wheel, a latch disposed in the path of the pin carried by each cam wheel to stop the cam wheel once during every revolution, means for setting the latch in different angular positions around the cam wheel whereby the cam wheels at each location may be stopped in any predetermined angular position whereby the cam wheels may be set to effect the delivery of current impulses in a predetermined timed sequence, electromagnetic means for releasing the latch to release the cam wheel, a transmitter for periodically delivering currents through the motor circuit system to release all of the latches simultaneously to permit the continued rotation of the cam wheels to effect the delivery of current impulses in the predetermined timed sequence.

11. In a synchronizing system for a sequence pulsing system for delivering current impulses to a plurality of stations in a predetermined timed sequence, in combination of local power circuit system for delivering current at each location, a plurality of units cooperative to effect the delivery of current impulses at each location, each unit comprising a motor driven cam wheel, a slip clutch disposed between the motor and cam wheel, means carried by the cam wheel for closing and interrupting the local circuit to effect the delivery of current impulses, means for interrupting the rotation of the cam wheel periodically, the means for interrupting the rotation of the cam wheel periodically being disposed to be set at different angular positions relative to the cam wheel and means for delivering current to the means for interrupting the rotation of the cam wheel periodically to effect stopping of all the cam wheels to check and synchronize them to continue delivering current impulses at the different locations in the predetermined timed sequence.

12. In a synchronizing system for a sequence pulsing system for controlling the operation of a plurality of devices in different locations, in combination, a plurality of motor driven units located at each location, a single circuit for supplying the motor driven units at each location, a local power circuit at each location cooperative in delivering current impulses, each unit comprising a cam wheel, means carried by the cam wheel for effecting the closing and interrupting of the local power circuit to cooperate in delivering current impulses, means for interrupting the rotation of the cam wheel, means for setting the means for stopping the rotation of the cam wheel in different angular positions relative to the cam wheel to effect in cooperation with the local power circuit the delivering of current impulses in a predetermined timed sequence, a thermal relay system for delivering current through the motor circuit system periodically to operate the means for interrupting the rotation of the cam wheel to effect the stopping of the cam wheels of all units in different relative positions to check and synchronize them to cooperate in the continuous delivery of the current impulses at the different locations in the predetermined timed sequence.

13. In a synchronizing system for a sequence pulsing system for delivering current impulses in a predetermined timed sequence, in combination, a plurality of motor driven units disposed in different locations cooperative in delivering current impulses, a single circuit system for supplying current to the motors of each of the units, a local power circuit system at each location cooperative with the units for delivering current impulses, each unit comprising a cam wheel driven by the motor, means provided on the cam wheel for closing and interrupting the local circuit system to effect the delivery of current impulses, a slip clutch between the cam wheel and the motor whereby the cam wheel may be stopped without stopping the motor, a mechanical latch provided on each unit for stopping the cam wheel, means for biasing the mechanical latch out of engagement with the cam wheels, electromagnetic means for actuating the latch into a position for stopping the cam wheel in the predetermined position to which it had been adjusted for sending current impulses in a predetermined timed sequence, the biasing means cooperative with the electromagnetic means to release all of the cam wheels simultaneously after they have been checked and synchronized.

14. In a synchronizing system for a pulsing system, in combination, a plurality of units electrically connected in circuit relationship for delivering electric pulses in a predetermined arrangement, means for interrupting and synchronizing said pulse delivering units in a predetermined operational order corresponding to said pulse arrangement, and means for actuating said interrupting and synchronizing means to interrupt all the units simultaneously in said predetermined order to maintain the pulses delivered by said units in said arrangement.

15. In a synchronizing system for a pulsing system, in combination, a plurality of units electrically connected in circuit relationship for delivering electric pulses periodically, means for setting each unit to effect the delivery of the pulses from said units in a predetermined arrangement, means for interrupting and synchronizing the unit setting means in a predetermined operational order corresponding to said pulse arrangement, and means for actuating said interrupting and synchronizing means to interrupt all of said unit setting means simultaneously in said predetermined order to maintain the pulses delivered by the units in said arrangement relation.

16. In a synchronizing system for a pulsing system, in combination, a plurality of units connected in circuit relationship for delivering electric pulses in a predetermined arrangement, means provided in conjunction with each unit for interrupting the operation of said units in a predetermined operational order of said units one to another, said order corresponding to said pulse arrangement, and means for periodically and simultaneously operating said interrupting means to synchronize said units in relation to said pulse arrangement.

17. In a synchronizing system for a pulsing system, in combination, a plurality of units capable of relative movement in a cyclic path and connected in circuit relationship for delivering electric pulses in a predetermined arrangement, a cooperating stop member and movable detent member for each of said units, means for mounting one of said members on the associated one of said units and for mounting the other of said members at a relatively fixed location adjacent said associated unit, said fixed locations being disposed relative to the respective paths of said units in an array corresponding to said pulse arrangement, each of said movable detents being actuatable to engage its associated stop and to interrupt the operation of its associated unit, and means for periodically and simultaneously actuating said movable detents to synchronize said units in relation to said fixed locations and to said pulse arrangement.

18. In a synchronizing system, the combination comprising a rotatable member, means for driving the rotatable member, a slip clutch disposed between the driving means and the rotatable member, a stop member carried by the rotatable member, a latch mechanism including a latch member, said latch member being disposed for movement by said mechanism into engagement with said stop member to stop the rotation of the rotatable member and to cause the clutch to slip, means for moving the latch mechanism in a direction generally parallel to the path described by the stop member as the rotatable member is rotated so that said rotatable member can be stopped in any angular position thereof, and means forming part of said latch mechanism for disengaging said latch member from said stop member.

19. In a synchronizing system, the combination comprising an element mounted for movement through a prescribed path, means for driving said movable element, slip means coupling said driving means and said movable element, a latch mechanism mounted for movement adjacent said movable element, cooperative means mounted on said mechanism and on said element for stopping the movement of said movable element and for thereby causing said slip means to slip, means for adjustably moving said latch mechanism in a direction generally parallel to said prescribed path to provide for stopping said movable element in any position relative to said path.

References Cited in the file of this patent

UNITED STATES PATENTS

| | | |
|---|---|---|
| 1,930,159 | Crilly | Oct. 10, 1933 |
| 2,412,676 | Dunajeff | Dec. 17, 1946 |
| 2,522,881 | Linder et al. | Sept. 19, 1950 |
| 2,656,472 | Putz | Oct. 10, 1953 |
| 2,852,705 | Reynolds | Sept. 16, 1958 |